(12) United States Patent
Ward et al.

(10) Patent No.: US 11,663,439 B2
(45) Date of Patent: May 30, 2023

(54) CARRIER AND TIE ASSEMBLY FOR ELECTRONIC CHIP TO IDENTIFY AND MANAGE OIL AND GAS EQUIPMENT

(71) Applicant: SPM Oil & Gas Inc., Fort Worth, TX (US)

(72) Inventors: Ben Ward, Fort Worth, TX (US); Allen Eugene Gammel, Fort Worth, TX (US); Joshua Errett Wood, Weatherford, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 213 days.

(21) Appl. No.: 17/260,169

(22) PCT Filed: Jul. 16, 2019

(86) PCT No.: PCT/US2019/042040
§ 371 (c)(1),
(2) Date: Jan. 13, 2021

(87) PCT Pub. No.: WO2020/018563
PCT Pub. Date: Jan. 23, 2020

(65) Prior Publication Data
US 2021/0279546 A1    Sep. 9, 2021

Related U.S. Application Data

(60) Provisional application No. 62/698,633, filed on Jul. 16, 2018.

(51) Int. Cl.
*G06K 19/077*  (2006.01)
*G06K 19/04*   (2006.01)
(Continued)

(52) U.S. Cl.
CPC ....... *G06K 19/07775* (2013.01); *B65D 63/00* (2013.01); *G06K 19/041* (2013.01); *G06K 19/0723* (2013.01); *E21B 41/00* (2013.01)

(58) Field of Classification Search
CPC ......... G06K 19/07775; G06K 19/0723; G06K 19/041; G06K 19/00; B65D 63/00
(Continued)

(56) References Cited

U.S. PATENT DOCUMENTS

| 6,367,701 B1 | 4/2002 | Fries | |
| 2005/0259930 A1* | 11/2005 | Elkins, II | G02B 6/447 385/100 |

(Continued)

FOREIGN PATENT DOCUMENTS

| AU | 2012293680 A1 * | 1/2014 | ............ A61B 90/90 |
| CN | 105383794 A * | 3/2016 | ......... B65D 63/1027 |
| JP | 2008-040583 A | 2/2008 | |

OTHER PUBLICATIONS

International Search Report and Written Opinion for PCT/US2019/042040 dated Oct. 4, 2019.

*Primary Examiner* — Edwyn Labaze

(57) ABSTRACT

A cable-tie carrier is disclosed herein that includes a chip holder with a recess cavity for holding an electronic chip and a cable that is removably attached to the chip holder. The electronic chip stores identification information or testing data that may be used to identify and track the part. External computing devices (e.g., smart phone, tablet, scanner) may access the stored identification information or testing data for a user. The electronic chip is fastened, magnetically attached, or stuck with adhesive to the chip holder to position a transmitter (or antenna) to face out of the recess cavity.

20 Claims, 17 Drawing Sheets

(51) Int. Cl.
    *G06K 19/07*     (2006.01)
    *B65D 63/00*     (2006.01)
    *E21B 41/00*     (2006.01)

(58) Field of Classification Search
    USPC .................................................. 235/487, 375
    See application file for complete search history.

(56) References Cited

U.S. PATENT DOCUMENTS

| | | |
|---|---|---|
| 2009/0009412 A1 | 1/2009 | Warther |
| 2014/0340217 A1* | 11/2014 | Moenning ............ A61B 5/6824 |
| | | 600/300 |
| 2016/0032707 A1 | 2/2016 | Bowman |
| 2016/0060009 A1 | 3/2016 | Verhoeven |
| 2020/0184291 A1* | 6/2020 | Tisdel .............. G06K 19/07758 |

* cited by examiner

CARRIER AND TIE ASSEMBLY FOR ELECTRONIC CHIP TO IDENTIFY AND MANAGE OIL AND GAS EQUIPMENT

CROSS REFERENCE TO RELATED APPLICATIONS

This application is filed under 35 U.S.C. 371, and claims the benefit of and priority to PCT/US2019/042040, having a filing date of Jul. 16, 2019, entitled "CARRIER AND TIE ASSEMBLY FOR ELECTRONIC CHIP TO IDENTIFY AND MANAGE OIL & GAS EQUIPMENT," which claims the benefit of and priority to U.S. Provisional Patent Application No. 62/698,633 having a filing date of Jul. 16, 2018, all of which are hereby incorporated by reference in their entirety for all purposes.

TECHNICAL FIELD

This disclosure generally relates to a connector for use in securing electronic chips to the parts that are being tracked or serviced.

BACKGROUND

Several systems are used to facilitate oil and gas (O&G) exploration and production operations. One example is a hydraulic fracturing ("frack" or "fracturing") system, which pumps fluid to a wellhead for propagating fractures in a formation through which a wellbore extends, the wellhead being the surface termination of the wellbore. In many cases, different components of different hydraulic fracturing systems need to be identified and tracked to, for example, improve safety by replacing system components before they unexpectedly fail, reduce system downtime and cost by eliminating unexpected component failures and/or component performance degradations, and facilitate planning of future systems by identifying suitable existing components for the future systems.

Frack systems typically involve numerous parts that are usually are only capable of operating for a certain lifecycle before needing repair or replacement. An entire ecosystem of service centers exists to repair the various parts used in the frac business, as well as in normal oil and gas (O&G) exploration. These parts are constantly being transported, inspected, serviced, redeployed, and/or scrapped. Today's tracking systems for these parts are largely antiquated, using paper reports or first-generation computer systems that cannot monitor the parts in real time or convey the information those in the field and in-service centers need at point-in-time locations.

It is often desirable to mark or tag a part or components to facilitate tracking or logging of data relating to the component. For example, a tag may be attached to the component so that a log can be maintained to keep track of various parameters describing the component, such as, for example, date of installation of the component, last date of maintenance or service of the component, last date of inspection, and the like. Inspecting a tag manually generally takes more time is more likely to result in the collection of erroneous data. It would be beneficial to affix a tag to the component that can be read automatically by a reader device. For example, a radio frequency identification (RFID) tag that can be read by an RFID reader may be used.

SUMMARY

The disclosed examples are described in detail below with reference to the accompanying drawing figures listed below. The following summary is provided to illustrate some examples disclosed herein. It is not meant, however, to limit all examples to any configuration or sequence of operations.

Some aspects and examples disclosed herein are directed to a cable-tie carrier configured to hold an electronic chip with an antenna. The cable-tie carrier includes a chip holder having a recess cavity for receiving the electronic chip in a position to have the antenna facing out of the recessed cavity; and a cable having a first end that is permanently fixed to the chip holder and a second end that is removably attachable to the chip holder. Attachment of the second end causes the cable to form a cable loop configured to couple the chip holder to a part.

In some embodiments, the chip holder is made of aluminum.

In some embodiments, chip holder is made of at least one of polyurethane, rubber, or steel.

In some embodiments, the electronic chip comprises an RFID tag.

In some embodiments, the electronic chip comprises an NFC tag.

In some embodiments, the electronic chip stores an identifier specific to the electronic chip that is associated with the part.

In some embodiments, the electronic chip stores an identifier specific to the part to which the chip holder is coupled via the cable.

In some embodiments, the electronic chip stores a part number or manufacturer of the part.

In some embodiments, the second end of the cable is threaded through the chip holder.

In some embodiments, the electronic chip is held in the recessed cavity by epoxy, glue, or at least one magnet.

In some embodiments, the part is an oil-and-gas part comprising at least one member of a group comprising: a fluid end, a swivel, a joint, a manifold trailer, safety iron, a safety hammer, a dart valve, a plug valve, a clapper check valve, a pressure relief valve, an emergency unloading valve, a gate valve, a subsea dosage valve, a hydraulic valve, a valve seat, a butterfly valve, a steadseal valve, a hyperseal valve, a Polytetrafluoroethylene-lined valve, a swingthrough valve, a rubber-sealing valve, a rubber-line valve, a fire safe valve, a swing and lift check valve, a T-pattern globe valve, a Y-pattern globe valve, a three-way globe valve, a compressor check valve, a cold reheat check valve, a cold heat check valve, a testable check valve, a reverse current valve, a parallel slide valve, a gate valve, a safety valve, a safety relief valve, an isolation valve, a relief valve, a mounted-ball valve, a ball valve, a diaphragm valve, a triple offset butterfly valve, a gate and globe valve, a check valve, a lift check valve, a swing check valve, a steam isolation valve, a feedwater isolation valve, an integrated safety valve, a single-stage turbine, a multi-stage turbine, a hydraulic turbine, a pump turbine, a quad-runner turbine, a gear operator, a pneumatic actuator, a pressure control panel, a lifting clamp, a flow line safety restraint, a choke, a drop ball injector, a pump, a blowout preventer, a gas separator, an overshot connector, a wellhead, a frac pump, a manifold system, a fluid end system, a slurry pump, a water pump, a subsea pump, a premix tank, a frac tree, a swellable packer, a manifold skid, a tubing head, a wellhead, a rod rotator, a stuffing box, casing head, a tubing head, or a control valve.

Other aspects are directed to a cable-tie carrier configured to hold a radio frequency (RFID) electronic chip. The cable-tie carrier includes: an electronic chip configured to store an identifier specific to either the electronic chip or a part; a chip holder having a recess cavity for holding the electronic chip; an adhesive for holding the electronic chip in the recess cavity; and a cable having at least one end that is removably attachable to the chip holder. Attachment of the at least one end causes the cable to form a cable loop configured to couple the chip holder to a part.

In some embodiments, the chip holder is made of aluminum.

In some embodiments, the adhesive is an epoxy.

In some embodiments, the adhesive is disposed along a back face of the electronic chip facing a recessed face of the recess cavity.

In some embodiments, the identifier comprises a serial number of the part.

In some embodiments, the electronic chip is configured to transmit the identifier to an external computing device through an antenna on the electronic chip that is positioned to face out of the recess cavity.

Still other aspects are directed to a system that includes a part, an electronic chip, and a chip holder. The electronic chip includes: a processor, memory for storing an identifier or test data specific to the part, and an antenna for transmitting the identifier or the test data; and a cable-tie carrier that includes. The chip holder has a recess cavity for holding the electronic chip in a position that orients the antenna to face out of the recess cavity and a cable having at least one end that is removably attachable to the chip holder. Attachment of the at least one end causes the cable to form a cable loop configured to couple the chip holder to the part.

Some embodiments additionally include a computing device with an ID reader configured for retrieving the identifier or the test data from the electronic chip.

In some embodiments, the computing device is a smart phone or a mobile tablet.

In some embodiments, the electronic chip is attached to the chip holder by one or more magnets.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Generally, embodiments disclosed herein relate to cable-tie carriers to hold electronic chips that are rugged enough to be attached to industrial parts and equipment (e.g., O&G equipment). In some embodiments, the cable-tie carriers include a chip holder that holds the electronic chip and a cable that may be threaded through the parts. The cable may be fixedly or removably attached to the chip holder, e.g., welded to one side and threaded through the chip holder on the other side. Additionally, the chip holder has a recessed cavity for holding the electronic chips, either through epoxy, glue, fasteners, magnets, or other ways of attaching the electronic chips. As discussed below, the recessed cavities include an open side that allows for the antenna of the electronic chips to transmit identifiers, data, or other signaling about the part or electronic chip without obstruction in at least one direction.

In some embodiments, the electronic chips are RFID, NFC, or other electronic tags capable of storing various data about the parts or the electronic chips. For instance, the electronic chips may store part identifiers, part numbers, serial numbers, inspection data, testing data, or other data specific to the part. Additionally or alternatively, the electronic chips may store identifiers unique to the electronic chips, and a backend service may associate such identifiers with the parts to which they are attached. Further still, the electronic chips may store environmental data associated with the part (e.g., location, movement, building number, etc.).

The electronic chips may be read by various electronic computing devices, such as a smartphone, mobile table, or other computing device with an RFID, NFC, BLUETOOTH®-BRANDED low energy (BLUETOOTH® LE), or other wireless reader capable of retrieving data from the electronic chips being held on the parts by the cable-tie carriers disclosed herein. Thus, some examples of the disclosure may be described in the general context of computer-executable instructions, such as program modules, executed by one or more computers or other devices in software, firmware, hardware, or a combination thereof. For purposes of this disclosure, the terms electronic tag, electronic chip, RFID chip, and NFC chip are referenced synonymously are generally referenced below as an "electronic chip."

Figure 1A:
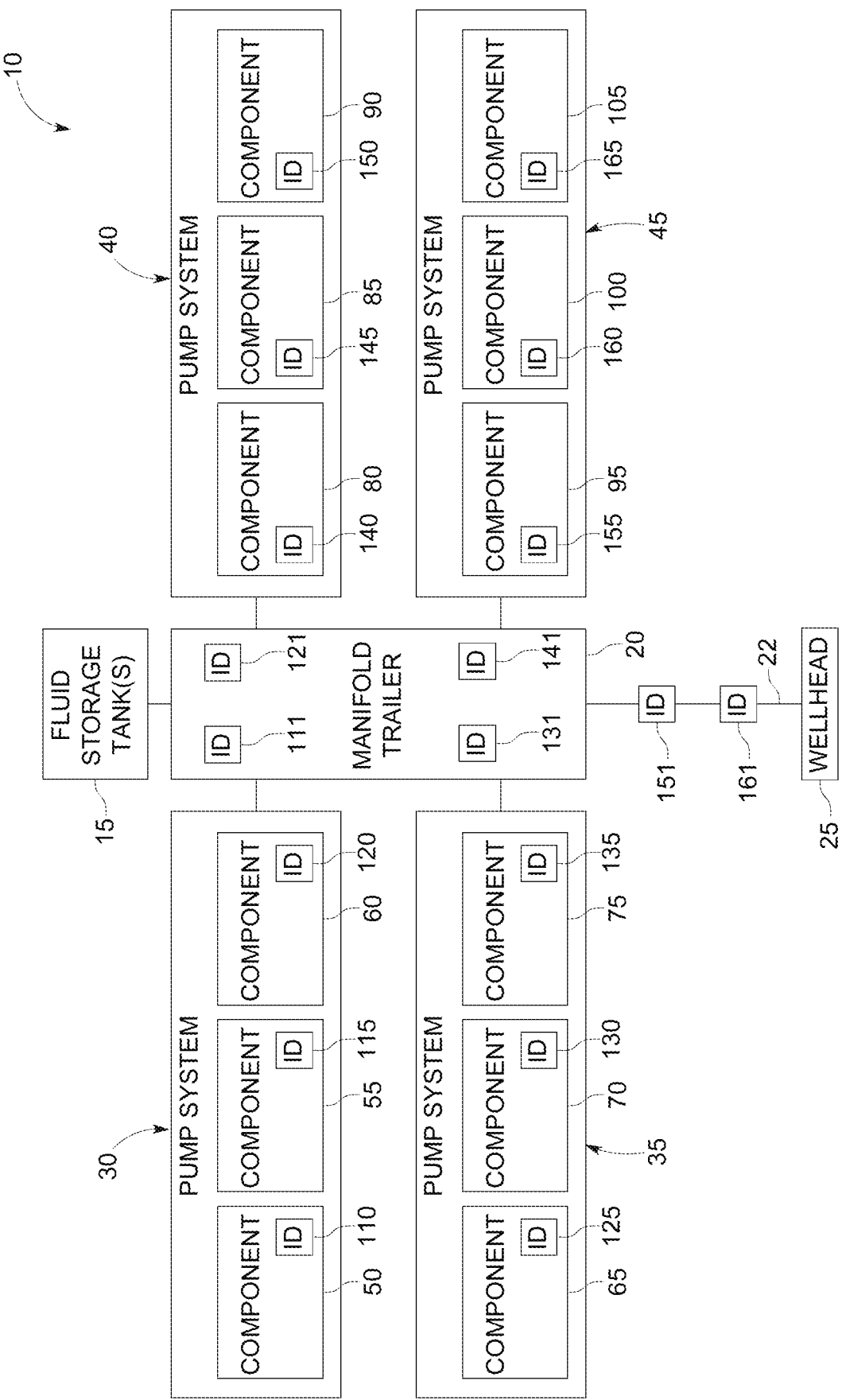
FIG. 1A illustrates a blog diagram of a fracking configuration for pumping fluid to a wellhead with component parts that are tagged with electronic chips, according to some embodiments.
Figure 1B:
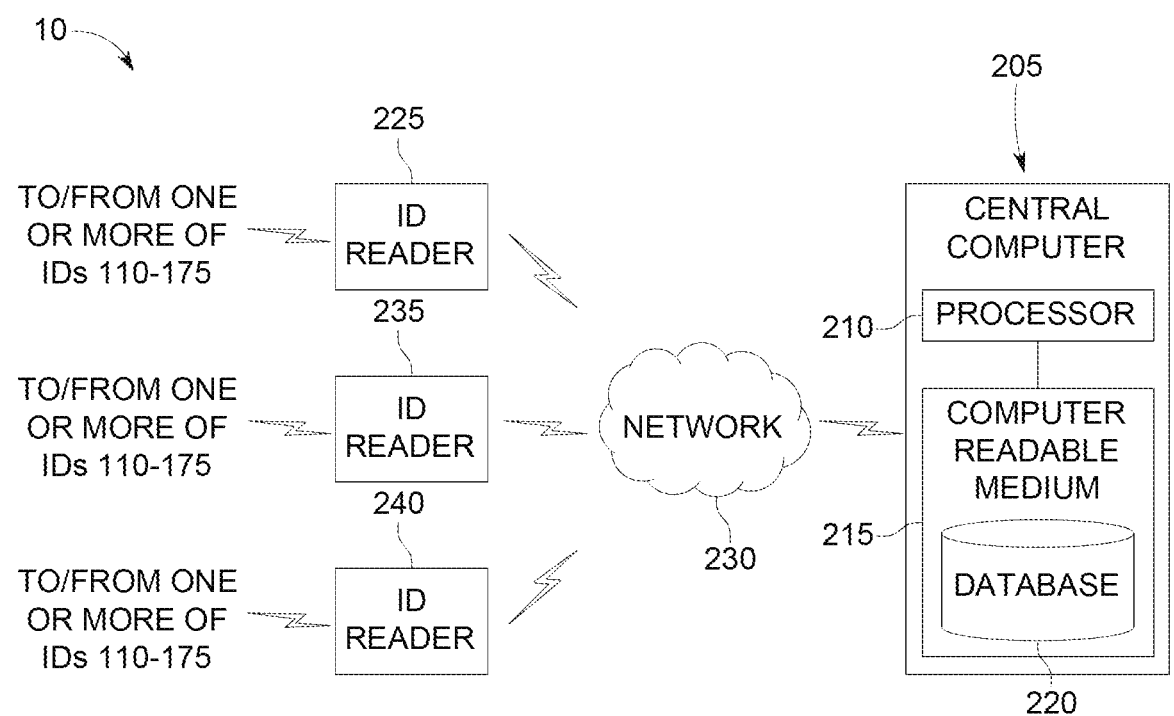
FIG. 1B illustrates a block diagram of a networking environment for retrieving a processing information about parts stored in electronic chips that are coupled to the parts using cable-tie carriers, according to some embodiments.

In some specific embodiments, the disclosed chip holders may be attached to O&G parts that are operating in the field. FIGS. 1A and 1B illustrate one non-limiting example scenario in the O&G space in which the disclosed cable-tie holders may be used to hold electronic chips to parts. This discussion is provided merely to show the reader how the disclosed cable-tie holders may be used in field. It is not, however, meant to limit embodiments to O&G operations or equipment, unless specifically stated below to do so.

FIG. 1A illustrates one example of a fracking configuration 10 used to supply frack fluid to a wellhead 25 for O&G operations. This is but one non-limiting example provided to show the types of parts the disclosed chip holders and electronic chips may be attached. Myriad other uses are also fully contemplated. For instance, the disclose chip holders may be used to secure electronic chips to any other type of assembled parts or machinery (e.g., automobile; aerospace; heating, ventilation, and air conditioning (HVAC) equipment; electrical systems; chemical equipment; or the like).

Specifically, FIG. 1A shows a block diagram of a manifold trailer 20 in fluid communication with fluid storage tanks 15. A wellhead 25 is in fluid communication with the manifold trailer 20 via one or more fluid lines 22. The wellhead 25 sits atop a wellbore through which frack fluid is pumped and/or oil and gas is extracted. Various frack pump systems 30, 35, 40, and 45 are in fluid communication with the manifold trailer 20.

Pump system 30 includes various components 50, 55, and 60. Pump system 35 includes components 65, 70, and 75. Pump system 40 includes components 80, 85, and 90. And pump system 45 includes components 95, 100, and 105. Components 50-105 may include any number of industrial O&G parts. Examples include, without limitation, a trailer, frack pump, fluid end, piping and other fluid conduits, controls, and the like. In some embodiments, each of the components 50-105 is a tubular member, which may be, or may be a part of, a section of pipe, a fitting, a valve, a frac or well service pump component, a fluid line, a manifold, a fluid connection, and/or any combination thereof. In some embodiments, each of the components 50, 55, 60, 65, 70, 75, 80, 85, 90, 95, 100, and 105 is a section of pipe, a fitting, a valve, a ball injector, a bridal assembly, a cement head, a choke tee, a frac head, a hammer union, an integral union connection, a steel hose loop, a swivel joint, a flow line safety restraint system, clamps, a frack or well service pump component, a fluid line, a manifold, a fluid connection, and/or any combination thereof.

In operation, the fracking configuration 10 is adapted to pump fluid to the wellhead 25. One or more of the pump systems 30, 35, 40, and 45 pump fluid from the fluid storage tanks 15 to the wellhead 25 via at least the manifold trailer 20 and the fluid lines 22. In an exemplary embodiment, the fluid storage tanks 15 are frack tanks. In some embodiments, each of the pump systems 30, 35, 40, and 45 is, includes, or is part of, a frac truck, a frack or well service pump, and/or any combination thereof.

Electronic chips are coupled to different component parts of the frack configuration 10, either to parts of the pump systems 30, 35, 40, and 45 that pump frack fluid, to parts of the manifold trailer 20 conveying the frack fluid to the wellheads or zipper manifolds, to fluid lines, or a combination thereof. To illustrate this, numerous electronic chips 110, 115, 120, 125, 130, 135, 140, 145, 150, 155, 160, and 165 are shown attached to different components 50-105 of the various pump systems in the frack configuration 10. In the illustrated embodiment, electronic chips 110, 115, and 120 are coupled to components 50, 55, and 60, respectively, of pump system 30. Electronic chips 125, 130, and 135 are coupled to components 65, 70, and 75, respectively, of pump system 35. Electronic chips 140, 145, and 150 are coupled to components 80, 85, and 90, respectively, of pump system 40. Electronic chips 155, 160, and 165 are coupled to components 95, 100, and 105, respectively, of pump system 45.

Additionally, the electronic chips 111, 121, 131, 141, 151, and 161 are shown attached to different components of the various manifold trailer and conduits therefrom to the wellhead 25. In the illustrated embodiment, electronic chips 111, 121, 131, and 141 are coupled to components of the manifold trailer 20. Examples of the electronic chips being attached to parts of a manifold trailer are shown in FIGS. 1E-1F, and discussed in more detail below. Moreover, in some embodiments, "wear parts" are tagged with the electronic chips discussed herein, using the cable-tie carriers discussed below and shown in FIGS. 2-12. Wear parts refer to parts that wear down over time, e.g., swivels, joints; valves (e.g., knife, plug, API, etc.); gears; gear boxes; blow-out preventors; or the like.

In some embodiments, electronic chips may be attached to various fluid lines that supply frack fluid to the wellhead 25, or a zipper manifold that, in turn, provides the frack fluid to the wellhead 25. To illustrate this, electronic chips 161 and 171 are shown coupled to the fluid lines 22. To further illustrate, one particular example of a manifold trailer is shown in FIG. 1F.

In some specific examples, the manifold trailer includes a "large bore" conduit for high-pressure frack fluid. Large bore refers to a fluid conduit of 5-9 inches of inner diameter. In one particular embodiment, the large bore conduit has an inner diameter of 7 inches. Moreover, to create the large bore conduit, the manifold trailer 20 may, in fact, be multiple trailers, skids, or other platforms that are connected together to create a continuous large bore conduit. An example of a multi-platform manifold trailer is shown in FIG. 1D.

In some embodiments, the electronic chips 110-175 are read or scanned by an identification (ID) interrogator or reader, such as ID reader 225, 235, and/or 240 shown in FIG. 1B below. Moreover, the depicted number of electronic chips are not meant to limit embodiments to any quantity of electronic chips on the various parts of the frack configuration 10. In some embodiments, the electronic chips 110-175 are read or scanned by an identification (ID) interrogator or reader, such as ID reader 225, 235, and/or 240 shown in FIG. 1B below.

In some embodiments, the electronic chips 110-175 store an identifier (ID) that is uniquely assigned to either the electronic chip 110-175 or the components 50-105. For example, the electronic chip 110 may be an RFID, NFC, or BLUETOOTH® LE chip with an ID specific to the electronic chip 110 (e.g., SSID, and that may be associated (e.g., by a cloud service) with the component 50 to which the electronic chip 110 is attached. Alternatively or additionally, the electronic chip 110 may be an RFID, NFC, or BLUETOOTH®-branded LE chip with an ID specific to the component 50 (e.g., the manufacturer ID, part number, customer number, or the like) that is programmed onto the chip. In other words, the electronic chips discussed herein may store their own specific identifier or have identifiers of the parts to which they are attached stored thereon.

Though not shown, a cloud service may host a part-tracking service that monitors and tracks parts based on readings performed in service centers or the field by service people who scan the electronic chips in the cable-tie carriers disclosed herein. For example, a service person may scan a part that has a cable-tie carrier with an electronic chip, a chip identifier for that chip may then be communicated to the part tracking service 212, along with any other relevant location data (e.g., GPS), operational data (e.g., whether the part is connected to an operational well or is non-operational in a service center or on a transportation truck), historical data (e.g., history of service of the part), and/or manufacturing information (e.g., part borne data, manufacturer, or the like). Alternatively, only the identifier of the electronic chip or the part may be sent by an external computing device (e.g., computing device 1300 in FIG. 13) of the service person, and the part tracking service may pair that information with the part that the cable-tie carrier is attached to, through usage of one or more databases, neural networks, or the like in tracking, in real-time, the part to which the electronic chip (and cable-tie carrier) are attached.

The electronic chips 110-175 are secured or attached to the components of the fracking configuration 10 using a specialized chip holder. Some embodiments use the cable-tie carrier 200 illustrated in FIGS. 2-12 and described in more detail below to attach electronic chips 110-175 to the components 50-105. Again, the fracking configuration 10 shown in FIG. 1A is but one non-limiting example of an environment with parts that have the electronic chips attached thereto.

Electronic chips may be attached to any type of part needing to be monitored, serviced, or otherwise tracked. For example, electronic chips may be attached to automobile; heating, ventilation, and, air conditioning (HVAC) equipment; farming; mining; or other types of industrial equipment that have constituent parts needing to be regularly serviced or otherwise monitored. In one particular example, the electronic chips are secured to the fluid end or power end of a frack pump using the cable-tie carriers 200 discussed below. In another example, the electronic chips are secured to different components of a slurry pump for mining operations using the cable-tie carriers 200 discussed below. In another example, the electronic chips are secured to different components of an automobile using the cable-tie carriers 200 discussed below. In another example, the electronic chips are secured to different components of a slurry pump for mining operations using the cable-tie carriers 200 discussed below. In another example, the electronic chips are secured to railroad cars using the cable-tie carriers 200 discussed below.

More specifically, some examples of O&G products, parts, or components that may have the electronic chips discussed herein attached thereto using the cable-tie carriers discussed below include, without limitation: a fluid end, a swivel, a joint, a manifold trailer, safety iron, a safety hammer, a dart valve, a plug valve, a clapper check valve, a pressure relief valve, an emergency unloading valve, a gate valve, a subsea dosage valve, a hydraulic valve, a valve seat, a butterfly valve, a steadseal valve, a hyperseal valve, a Polytetrafluoroethylene-lined valve, a swingthrough valve, a rubber-sealing valve, a rubber-line valve, a fire safe valve, a swing and lift check valve, a T-pattern globe valve, a Y-pattern globe valve, a three-way globe valve, a compressor check valve, a cold reheat check valve, a cold heat check valve, a testable check valve, a reverse current valve, a parallel slide valve, a gate valve, a safety valve, a safety relief valve, an isolation valve, a relief valve, a mounted-ball valve, a ball valve, a diaphragm valve, a triple offset butterfly valve, a gate and globe valve, a check valve, a lift check valve, a swing check valve, a steam isolation valve, a feedwater isolation valve, an integrated safety valve, a single-stage turbine, a multi-stage turbine, a hydraulic turbine, a pump turbine, a quad-runner turbine, a gear operator, a pneumatic actuator, a pressure control panel, a lifting clamp, a flow line safety restraint, a choke, a drop ball injector, a pump, a blowout preventer, a gas separator, an overshot connector, a wellhead, a frac pump, a manifold system, a fluid end system, a slurry pump, a water pump, a subsea pump, a premix tank, a frac tree, a swellable packer, a manifold skid, a tubing head, a wellhead, a rod rotator, a stuffing box, casing head, a tubing head, a control valve, or the like. Myriad other uses are also contemplated. In sum, any products or parts that are regularly serviced or needing to be monitored may be outfitted with the disclosed electronic chips and cable-tie carriers 200 discussed below.

FIG. 1B illustrates a block diagram of a networking environment for retrieving a processing information about parts stored in electronic chips that are coupled to the parts using cable-tie carriers. As depicted, the frack configuration 10 further includes a central computer 205 that includes a processor 210 and a computer memory 215 operably coupled thereto. Instructions accessible to, and executable by, the processor 210 are stored in the computer memory 215. A database 220 is also stored in the computer memory 215. The ID reader 225 is operably coupled to, and in communication with, the computer 205 via a network 230. Likewise, ID readers 235 and 240 are each operably coupled to, and in communication with, the computer 205 via the network 230. Each of the ID readers 225, 235, and 240 is adapted to transmit signals to, and receive signals from, one or more of the electronic chips 110-175.

In some embodiments, the electronic chips 110-175 take the form of RFID chips. For such embodiments, the ID readers 225, 235, and 240 are RFID readers, either a dedicated RFID reader computing device or as part of a mobile computing device (e.g., smart phone, mobile tablet, laptop, or the like). In a specific embodiment, the ID readers 225, 235, and 240 are MC9090-G Handheld RFID Readers, which is available from MOTOROLA SOLUTIONS, INC.®, headquartered in Schaumburg, Ill. Alternatively, the ID readers 225, 235, and 240 are mobile phones (e.g., an IPHONE® manufactured by the APPLE CORPORATION®, headquartered in Cupertino, Calif.) capable of reading the electronic tags 110-175 110-175 and interacting with a part-tracking service (e.g., part-tracking service 1412 described below in reference to FIG. 14) via the network 230.

Figure 1C:
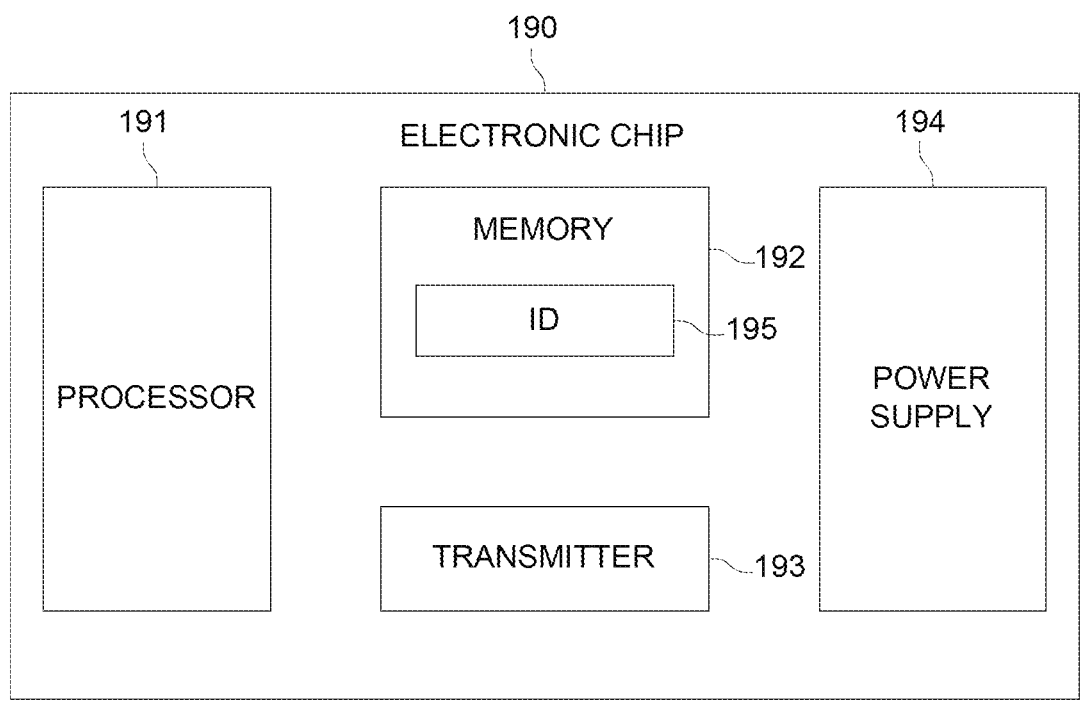
FIG. 1C illustrates a block diagram of one example of an electronic chip, according to some embodiments.
Figure 1D:
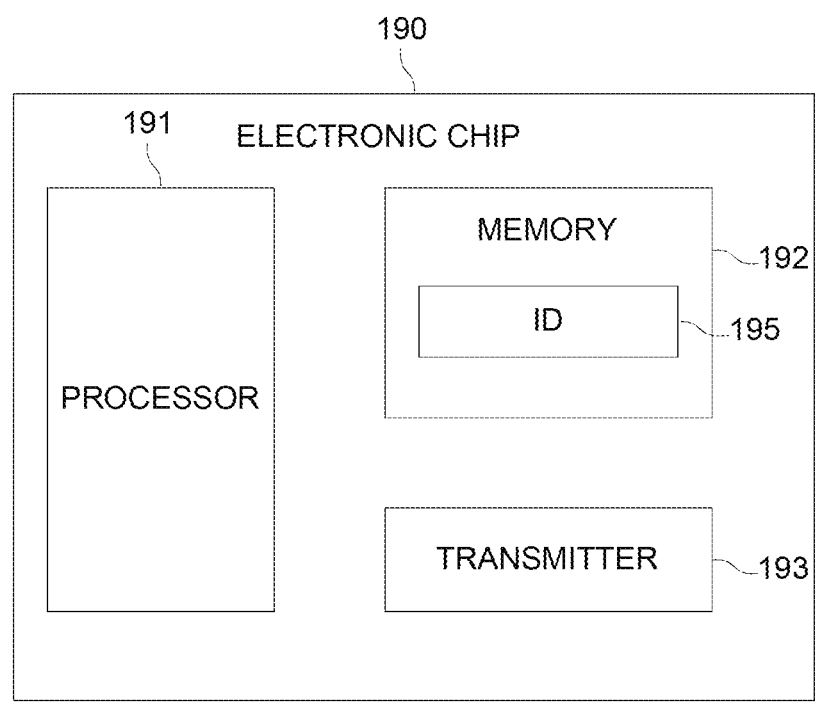
FIG. 1D illustrates a perspective view of a trailer manifold with a cable-tie holder that holds an electronic chip attached to a part, according to some embodiments.
Figure 1E:
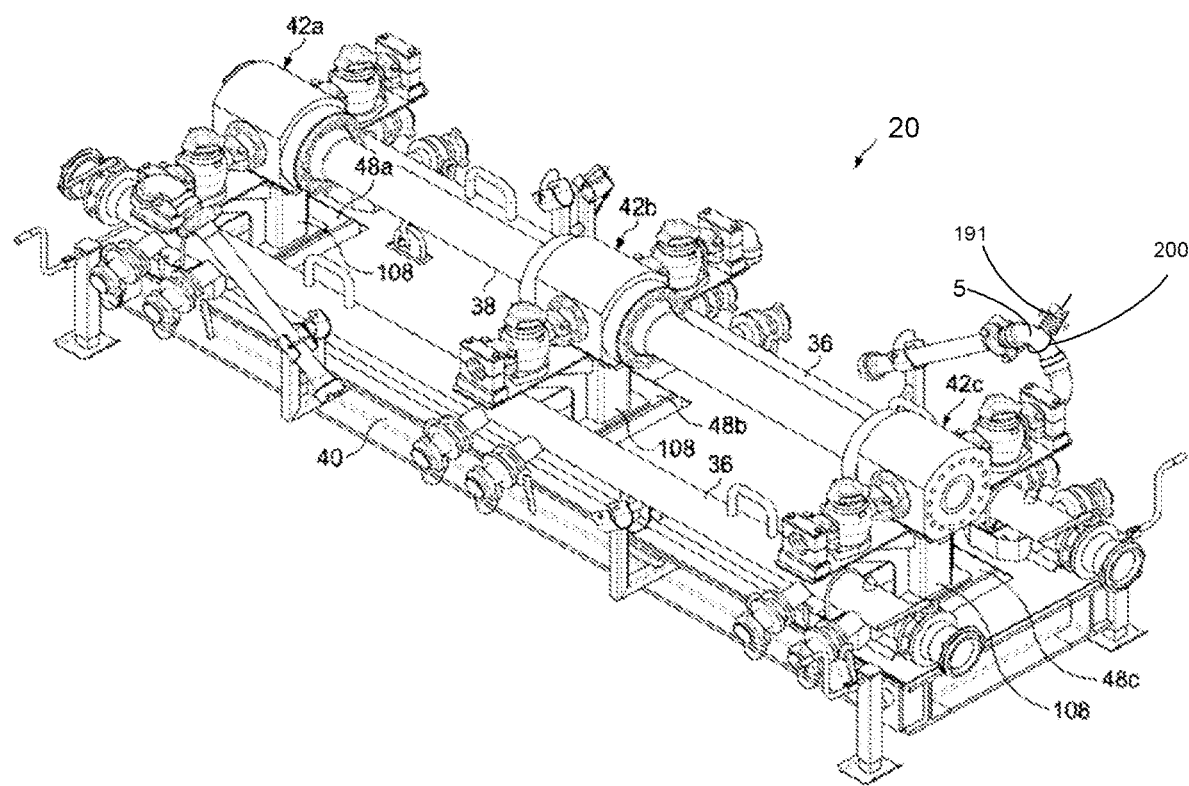
FIG. 1E illustrates a perspective view of an interconnected large bore iron system made up of several trailer manifolds that are connected to each other, according to some embodiments.
Figure 1F:
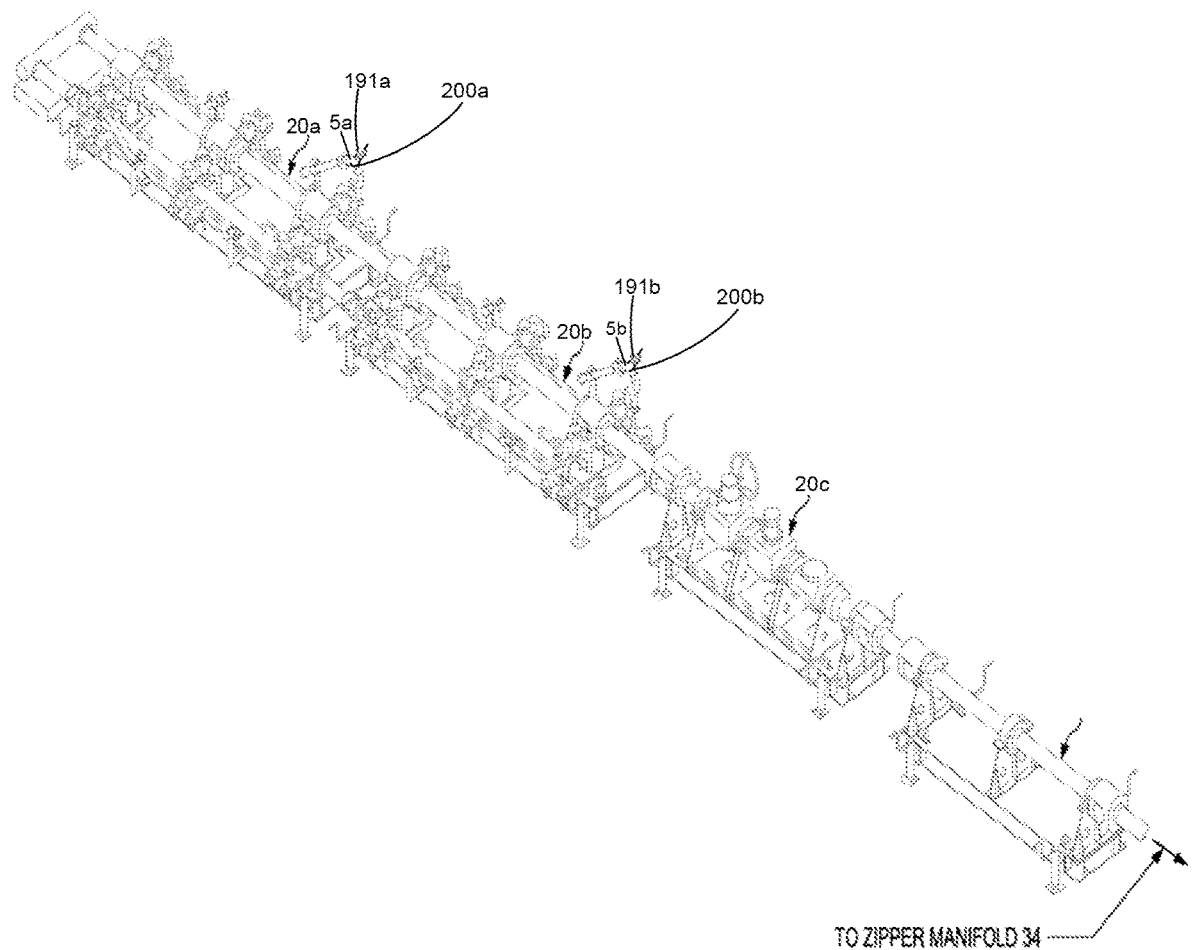
FIG. 1F illustrates a block diagram of one example of an electronic chip, according to some embodiments.

FIG. 1C illustrates a block diagram of one example of an electronic chip 190 that may be held by the cable-tie carrier 200 discussed below. In some embodiments, the electronic chip 190 includes a processor 191, memory 192, a transmitter 193, and a power supply 194. Alternatively, the electronic chip 190 may not include a power supply, relying instead on external power sources to energize the processor 191 and/or the transmitter 193 (e.g., in a NFC device). An ID 195, specific either to the part (e.g., part number) or the electronic chip (e.g., RFID tag ID) is stored in the memory 192.

Processor 191 may include one or more microprocessors, microcontrollers, arithmetic logic units (ALUs), integrated circuits (ICs), application-specific ICs (ASICs) or chips, systems on chip (SoC), or other processing units configured to instruct transmission of wireless location signals according to the techniques and methods disclosed herein. In one embodiment, processor 191 comprises a BLUETOOTH®-branded chip.

In operation, the electronic chip 190 transmits the ID 195 to external computing devices using the transmitter 193. Transmission may be initiated by the external device sending a signal to the electronic chip 190 that, in turn, causes the electronic chip 190 to transmit the ID. Other embodiments store additional or different information than the ID 195. Inspection data, test data, testing operations, manufacturer name, part number, part information, service dates, or any other information may be stored in the memory 192. Additionally or alternatively, the electronic chip 190 may be equipped with additional sensors (not shown) that measure location, temperature, days in operation, or other metrics that may be useful to service workers. For the sake of clarity, embodiments discussed herein reference only the ID 195 of the part or electronic chip 190 being stored and communicated; however, the any of the aforesaid data may additionally or alternatively be transmitted.

In some embodiments, transmitter 193 is an active or semi-passive radio RFID transmitter. Using active or semi-active RFID transmitters, transmitter 193 may wirelessly broadcast at a variety of frequencies, e.g., without limitation, at low frequency bands of or about 125/135 kHz, relatively high frequency bands (when compared to the low frequency band) of or about 13.56 MHz, and relatively ultra-high frequency bands (when compared to the low and high frequency bands) of or about 850-950 MHz. External computing devices may be tuned accordingly to listen for data packets along corresponding frequency bands used by the aforesaid communications protocols.

In other embodiments, the transmitter 108 comprises a BLUETOOTH®-branded transmitter capable of transmitting controlled-range wireless transmissions. Such BLUETOOTH®-branded transmitter may specifically use a BLUETOOTH®-branded LE (e.g., BLUETOOTH® version 4.x) or a BLUETOOTH®-branded Smart transmitter capable of transmitting wireless signals at further piconet distances and at lower peak, average, and idle mode power consumption than legacy BLUETOOTH®-branded transmitters. Other embodiments may use legacy BLUETOOTH®-branded transmitters (e.g., BLUETOOTH®-branded versions 1.x, 2.x, 3.x, etc.).

Additionally, the electronic chip 190 may be equipped with various sensors for gathering and storing (in the memory 192) other data from the environment or the status of the electronic chip 191. In this vein, the electronic chip 190 may also include a temperature sensor, pressure sensor, accelerometer, magnetometer, photometer, Global Positioning Sensor (GPS), or the like. These additional sensors may gather data regarding data about the environment (e.g., temperature, pressure, etc.) or the electronic chip (e.g., movement, acceleration, etc.).

FIG. 1D illustrates a block diagram of another example of an electronic chip 191 that is configured to passively transmit data, according to some embodiments. In operation, the electronic chip 191 in FIG. 1D does not have a power supply, and instead responds to external signaling that may be used to power the transmitter 193 for transmitting the disclosed IDs, part data, inspection data, test data, or the like. For example, an RFID or NFC chip may be used without a resident power source, harnessing received electrical signals to power the transmitter 193.

As previously mentioned, the previously discussed electronic chips 191 and subsequently discussed cable-tie carriers 200 may be affixed to any number of pumps in a fracking configuration 10. Several example manifold trailers and assemblies are disclosed in U.S. patent application Ser. No. 15/631,770 filed Jun. 23, 2017 and entitled "HYDRAULIC FRACTURING SYSTEM, APPARATUS, AND METHOD" (the "'770 application"), the entire disclosure of which is hereby incorporated herein by reference.

FIG. 1E provides one example in which an electronic chip 191 being held by a cable-tie carrier 200 is affixed to a swivel 5 of one example of a manifold trailer 20. Specifics for the example manifold trailer 20 in FIG. 1E are discussed in more detail in the '770 application, aside from the shown cable-tie carrier 200 and the electronic chip being attached to the swivel 5. The swivel 5 is a wear part, and therefore is an ideal candidate part for being tracked and monitored. For instance, the swivel 5 may wear over time and need to be serviced throughout its lifetime. By storing the identifiers, inspection data, or testing data disclosed herein in the electronic chip 191 attached to the swivel 5 via the cable-tie carrier 200, workers are able to scan the electronic chip 191 and retrieve up-to-date service data about that specific swivel 5. Any other part on the illustrated manifold of FIG. 1E may be tagged in the same way, i.e., with the electronic chips 191 and the cable-tie carrier 200.

FIG. 1F illustrates a perspective view of an interconnected large bore iron system made up of several trailer manifolds 20*a*, 20*b*, and 206 that are connected to each other, according to some embodiments. Specifics about the parts of the trailer manifolds 20*a*, 20*b*, and 20*c* are discussed in more detail in the '770 application, aside from the shown cable-tie carriers 200*a* and 200*b* and the electronic chip 191*a* and 191*b* being attached to the swivels 5*a* and 5*b*. Any other part on the illustrated manifold of FIG. 1E may be tagged in the same way, i.e., with the electronic chips 191 and the cable-tie carrier 200.

Figure 2:
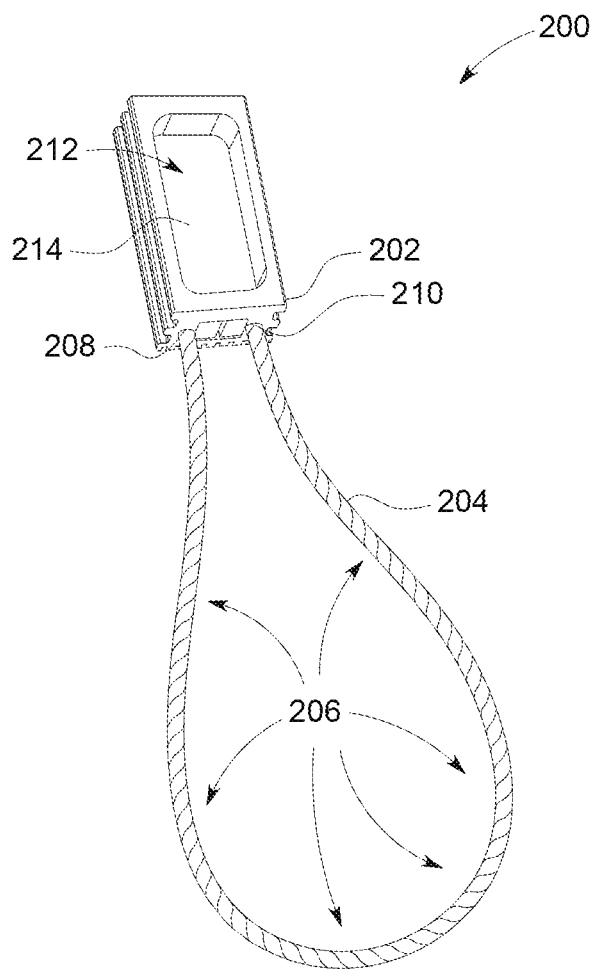
FIGS. 2-4 are perspective views of a cable-tie carrier having a recess cavity for an electronic chip, according to some embodiments.

FIG. 2 is a perspective view of a cable-tie carrier 200 for holding an electronic chip used in the monitoring of parts, according to some embodiments. As shown, the cable-tie carrier 200 includes: (1) a chip holder 202 with a recess cavity 212 for receiving the electronic chip 191, and (2) a cable 204 that is connected to the chip holder 202 at multiple (e.g., two) points. Together, the chip holder 202 and the cable 204 form a cable loop 206 that may be threaded through or around a part needing being monitored. The illustrated cable-tie carrier 200 provides an attachment mechanism for affixing the electronic chips discussed herein to parts or components needing to be tracked, monitored, or serviced.

In some embodiments, the cable 204 is fixed on one end 208 to the chip holder 202 and may be removably connected at another end 210. "Fixed," "fixedly connected" and "fixedly attached," as referred to herein, synonymously mean permanently connected. Examples of such connections include welding, fastening, using an interference fit, or the like. "Removably connected" and "removably attached," as referenced herein, means a user may operably attach and remove the cable 204 to the chip holder 202, e.g., using a locking mechanism.

Examples of locking mechanism include, without limitation, a clamp, a removable fastener, a magnet, a toothed groove that holds the cable 204, a lock, or other way for securing the cable 204 to the chip holder 202. Additionally or alternatively, the cable 204 may be attached to the chip holder 202 by inserting (or threading) an end of the cable 204 through a reciprocal opening of the chip holder that holds end. Thus, in some embodiments, the cable 204 with at least one end that may be attached or detached from the chip holder 202 by a user.

While some embodiments may have one end 208 of the cable 204 fixedly attached to the chip holder 202 and the other end 208 of the cable 204 removably connected to the chip holder 202, alternative embodiments configure the cable 204 to not have a fixedly attached end, and instead allow for both ends 208 and 210 to be removably selectively attached to the chip holder 202. Such embodiments provide additional flexibility so the chip holders 202 may be stored separately from the cables 204, or also the ability to quickly replace a broken cable 204.

In some embodiments, the chip holder 202 is manufactured from aluminum. Alternatively, the chip holder 202 may made from steel, iron, tungsten carbide, tungsten cobalt, ceramic, or another metal. Alternative still, the chip holder 200 may be made of a rubber or polyurethane material. Any combination of these materials may be used as well.

In some embodiments, the electronic chip 190 is positioned within the recess cavity 212 of the chip holder 202 and held in place within the recess cavity 212 using an adhesive (e.g., glue, epoxy, or the like); a weld (e.g., spot weld at a recessed face 214 of the recess); fasteners (e.g., screws, staples, or the like to the recessed face); magnets; a combination thereof, or any other ways for holding the electronic chip 191 within the recess cavity 212 of the chip holder 202. In one particular example, an epoxy fills the recess cavity 212 around at least a portion of the electronic chip 191 to hold the electronic chip 191 in place in the chip holder 202.

Figure 3:
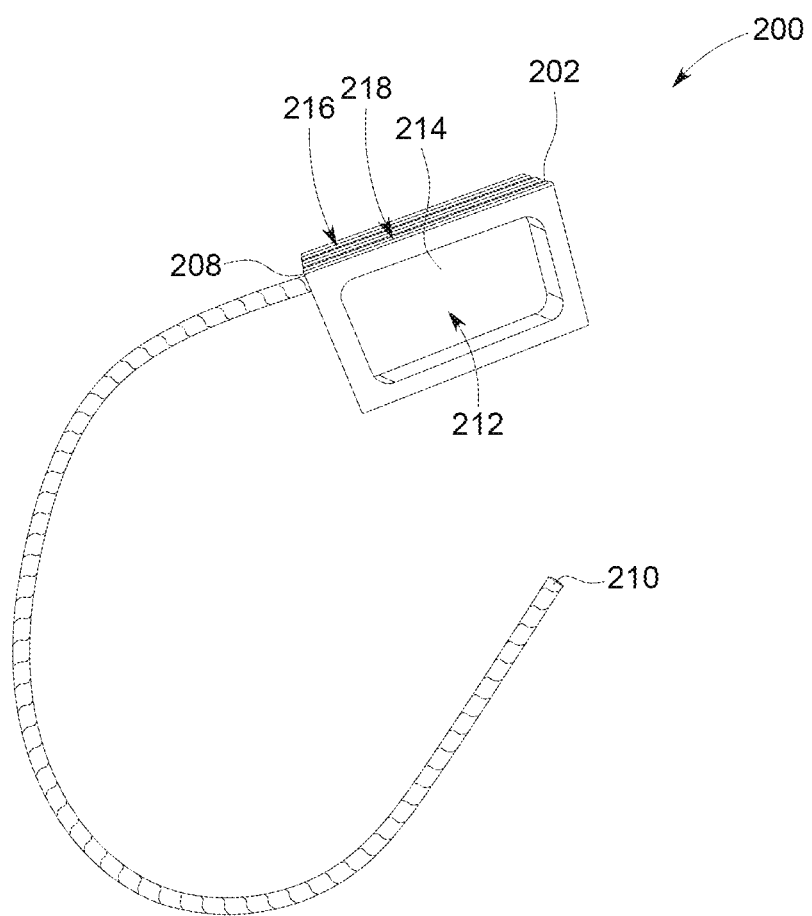
Figure 4:
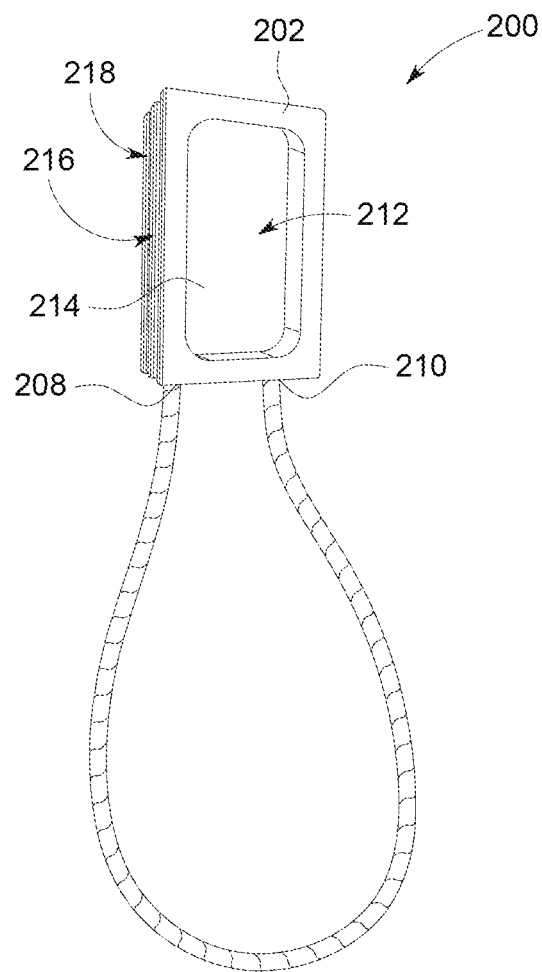

FIGS. 3-4 are perspective views of one embodiment of the cable-tie carrier 200 configured to hold the electronic chip 191, according to some embodiments. As shown, the cable-tie carrier 200 includes the chip holder 202 and the cable 204, which is connected fixedly connected at end 208 to the chip holder 202 and removably connected at end 210 to the chip holder 202. FIG. 3 illustrates the cable 204 in a disconnect state with end 210 detached from the chip holder 202, and FIG. 4 illustrates the cable 204 in a connected state with end 210 attached to the chip holder 202.

In some embodiments, the chip holder 202 comprises a rectangular shape with the recess cavity 212 creating a rectangular opening for the electronic chip 191 in the longitudinal direction of the chip holder 202. The recessed face 214 is located in the back of the opening created by the recess cavity 212. Also, in some embodiments, the chip holder 202 includes one or more (shown as two) grooves 216, 218, running parallel widthwise along an outer surface of the chip holder 202. These grooves 216, 218 may provide additional cooling for the electronic chip 202, as well as potential interlocking mechanisms for attaching the chip holder 202 to parts being tracked. For instance, a separate holder on the part to which the chip holder 202 is being attached may have reciprocal groves for receiving the grooves 216, 218, for attaching the chip holder 202 to the part.

The electronic chip 191 may be glued, epoxied, stuck, welded, snapped, fastened, bolted, screwed, or otherwise secured in place within the recess cavity 212. Though the illustrated embodiment shows a generally rectangular recess cavity 212, the recess cavity 212 may take any geometric form, e.g., square, triangular, trapezoidal, ellipsoidal, circular, or the like. An alternative embodiment includes legs that extend inward along a horizontal plane of an outer edge of the recess, operating as locking arms to keep the electronic chip in place.

Figure 5:
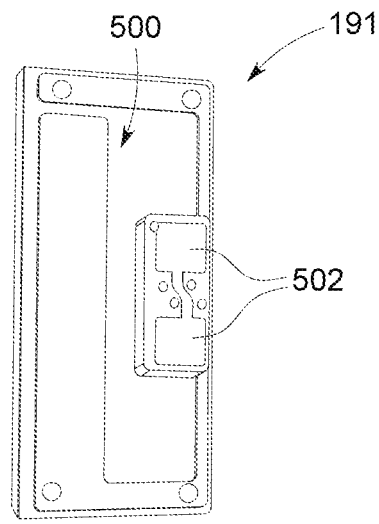
FIG. 5 is a perspective view of a top face of an electronic chip to be held in the recess cavity of the cable-tie carrier, according to some embodiments.

FIG. 5 illustrates a perspective view of one example of the electronic chip 191, according to one embodiment. Specifically, FIG. 5 shows the perspective of a top face 500 of the electronic chip 191 that is meant to face outward from the recess cavity 212 of the chip holder 202. In some embodiments, an antenna 502 is positioned along the top face 500, operating as the previously discussed transmitter 193 of the electronic chip 191. Allowing the antenna 502 to face outward from the recess cavity 212 increases the distance the transmitter 193 broadcasts radio frequency (RF), or other, signaling. If the antenna 500 (transmitter 193) were completely enclosed within the chip holder 202, the signal from the antenna 500 would be reduced. Thus, the disclosed design of the chip holder 202 enhances the performance of the electronic chip 193 by increasing its broadcast radius.

Figure 6:
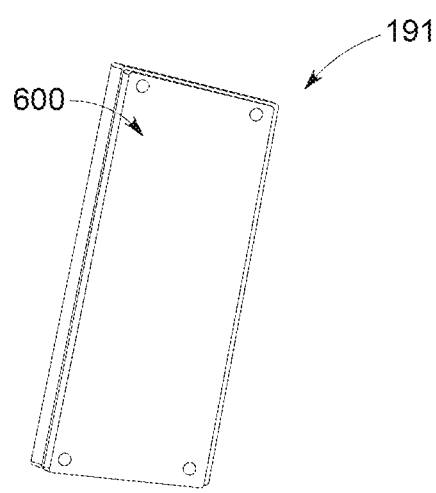
FIG. 6 is a perspective view of a back face of an electronic chip to be held in the recess cavity of the cable-tie carrier, according to some embodiments.

FIG. 6 illustrates a perspective view of one example of the electronic chip 191, according to one embodiment. Specifically, FIG. 6 shows the perspective of a back face 600 of the electronic chip 191 that is meant to face inward toward the recessed face 214. The back face 600 is positioned on the opposite side of the of the electronic chip 193 as the top face 500 shown in FIG. 5. Moreover, the back face 600 functions, in some embodiments, as a mounting surface for mounting electronic chip in the chip holder 202. In some embodiments, epoxy or other adhesive, magnets, fasteners, or other mounting mechanisms are used to hold the back face 600 against the recessed face 214. Other embodiments use epoxy or another adhesive around both the back face 600 and sides or even the top face 500 of the electronic chip 191 to hold the electronic chip 191 within the chip holder 202.

Figure 7:
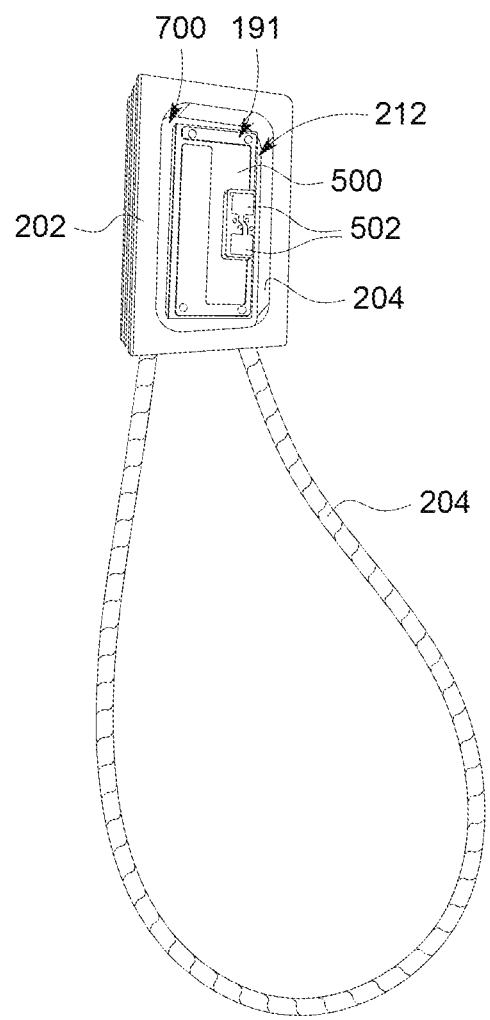
FIG. 7 is a perspective view of a cable-tie carrier with chip holder holding an electronic chip with a transmitter positioned at or near an edge of the electronic chip and facing outward from the chip holder, according to some embodiments.

FIG. 7 illustrates a perspective view of the electronic chip 191 within the recess cavity 212 of the chip holder 202, according to some embodiments. As depicted, the top face 500 of the electronic chip 191 faces out of the recess cavity 212. Positioned along the top face 500 is the antenna 502 that operates as the transmitter 193 of the electronic chip 191. Facing the antenna 502 outwardly to expose the antenna 502, without any obstructions from the chip holder 202, enables the antenna 502 to broadcast, or otherwise transmit, signals that include the previously discussed IDs, part information, testing data, etc. farther than if the antenna 502 was enclosed by the chip holder 502. The back face 600 (not show) of the electronic chip 191 is positioned to face the recess face 216 of the chip holder 202.

In some embodiments, the electronic chip 191 is rectangularly smaller than the opening created by the recess cavity 212. As such, a border gap 700 exists between the outer edges of the electronic chip 191 and the inner edges of the chip holder 202. In some embodiments, this border gap 700 is filled with epoxy or adhesive to hold the electronic chip 191 with the opening formed by the recess cavity 212. Filling the border gap 700 with epoxy or adhesive holds the electronic chip 191 in place within the chip holder 202 along four sides, thereby providing a secure way to attach the electronic chip 191 to the chip holder 202.

The electronic chips 191 shown in FIGS. 5 and 7 position the antenna 502 at or near (within 5%) of an edge of the top face 500 of the electronic chip 191. Alternatively, the electronic chip 191 may position the antenna 502 in the middle of the top face 500. Thus, the antenna 502 may be placed either at or near the middle or a peripheral edge of the top face.

Figure 8:
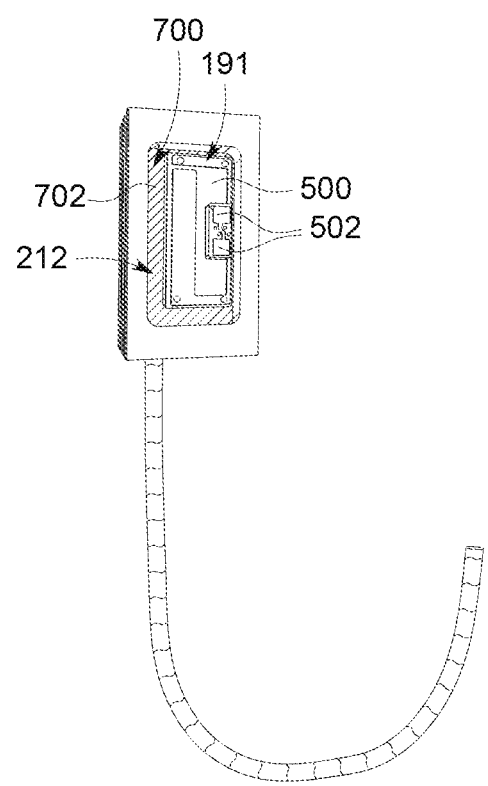
FIG. 8 illustrates a perspective view of another embodiment of the electronic chip.

FIG. 8 illustrates a perspective view of another embodiment of the electronic chip 191 within the recess cavity 212 of the chip holder 202, according to some embodiments. The recess cavity 212 is filled with the epoxy 702 to attach the illustrated electronic chip 191 to the chip holder 202, within the recess cavity 212. The epoxy 702 fills at least a portion of the boundary gap 700. Additionally or alternatively, the epoxy 702 may applied to the back face 600 of the electronic chip. As previously mentioned, alternative embodiments use other types of adhesives (e.g., glue); welds (e.g., spot weld); fasteners (e.g., screws, staples, or the like; a combination thereof, or any other locking or fastening mechanisms.

Figure 9:
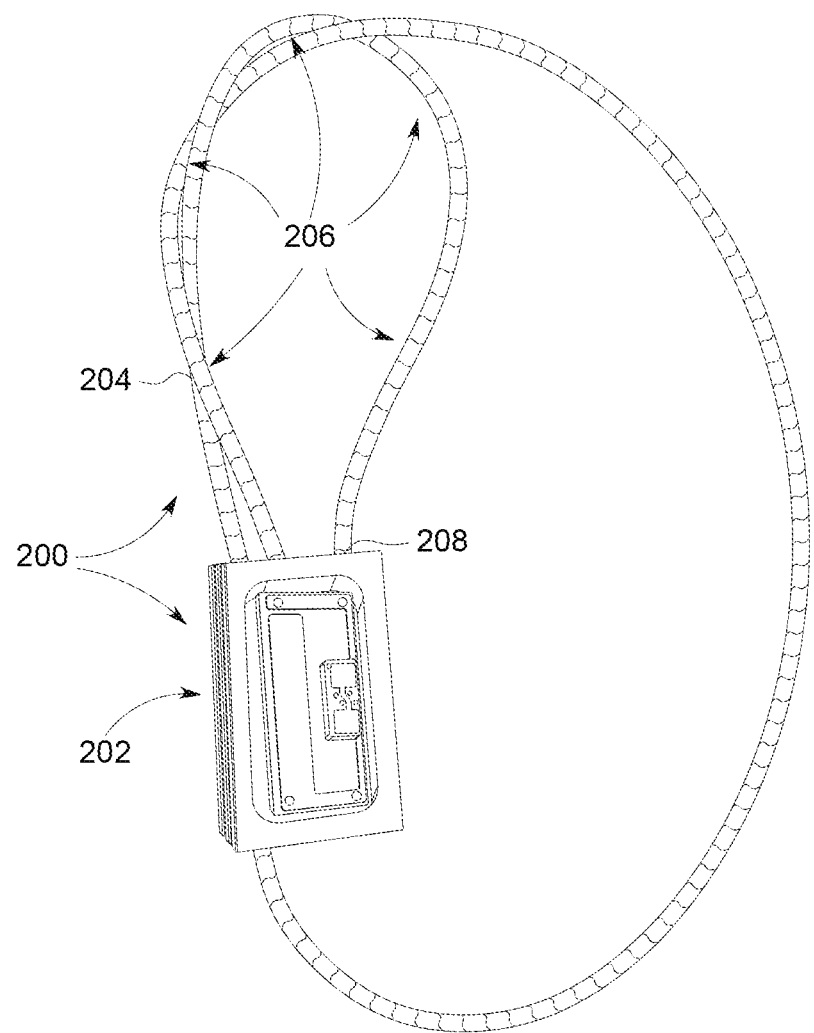
FIG. 9 illustrates the cable-tie carrier with the cable in a connected state with the chip holder.
Figure 10:
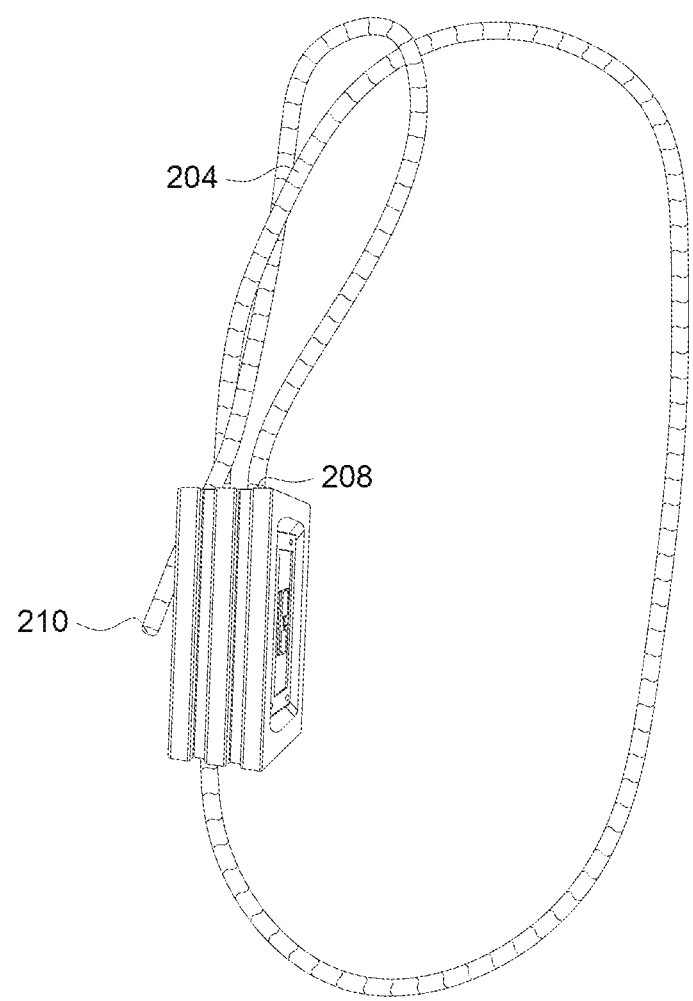
FIGS. 10-12 are perspective views showing a cable-tie carrier with one end of a cable being threaded through a chip holder, according to some embodiments.

FIGS. 9-10 illustrate the cable-tie carrier 200 with the cable 204 in a connected state with the chip holder 200, according to some embodiments. End 208 of the cable 204 is fixed to the chip holder 202. Another end 210, shown in FIG. 10, is threaded through a reciprocal opening of the chip holder 202. By threading end 210 of the cable through the chip holder 202 allows a user to adjust the size of the cable loop 206 to fit either tightly or loosely to parts.

Figure 11:
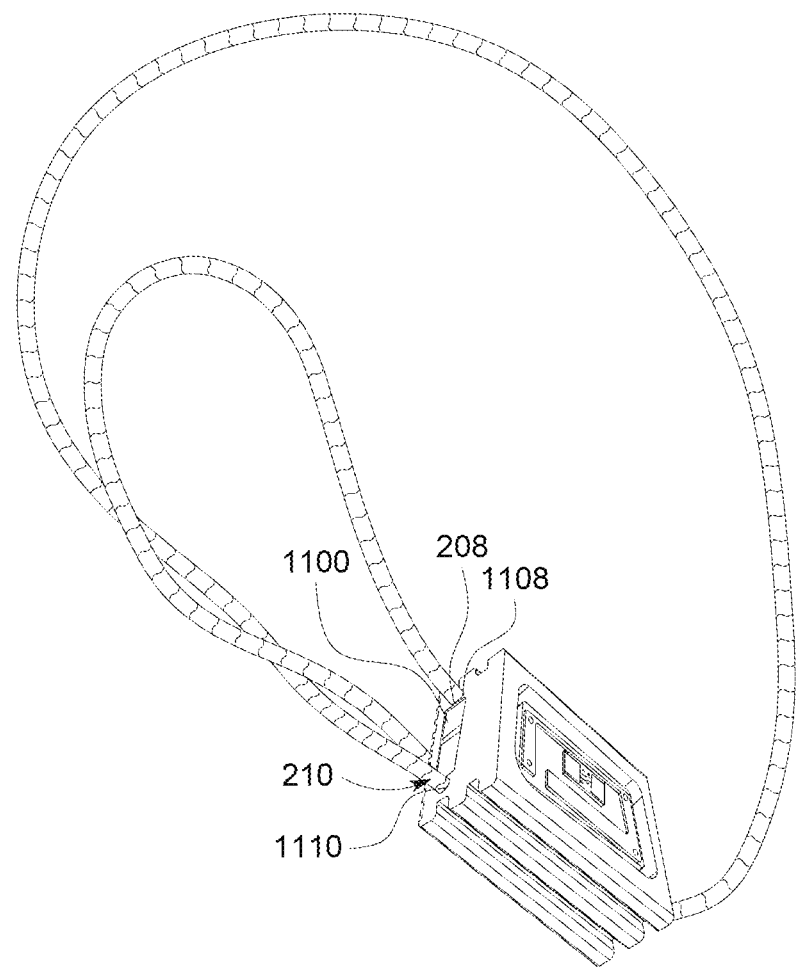

FIG. 11 illustrates one example of a locking mechanism 1100 within the chip holder 202 for holding the cable 204 being threaded therethrough, according to some embodiments. The illustrated embodiment of a locking mechanism 1100 forcibly holds (e.g., through spring activation) the cable 204 in place. Two openings 1108 and 1110 are used to respectively receive end 208 and end 210 of the cable 204. In some embodiments, end 208 is fixed to the chip holder 202 at the opening 1108, and end 210 is threaded through the chip 202 beginning at opening 1110. Alternatively, both ends 208 and 210 may be threaded through openings 1108 and 1110, respectively.

Figure 12:
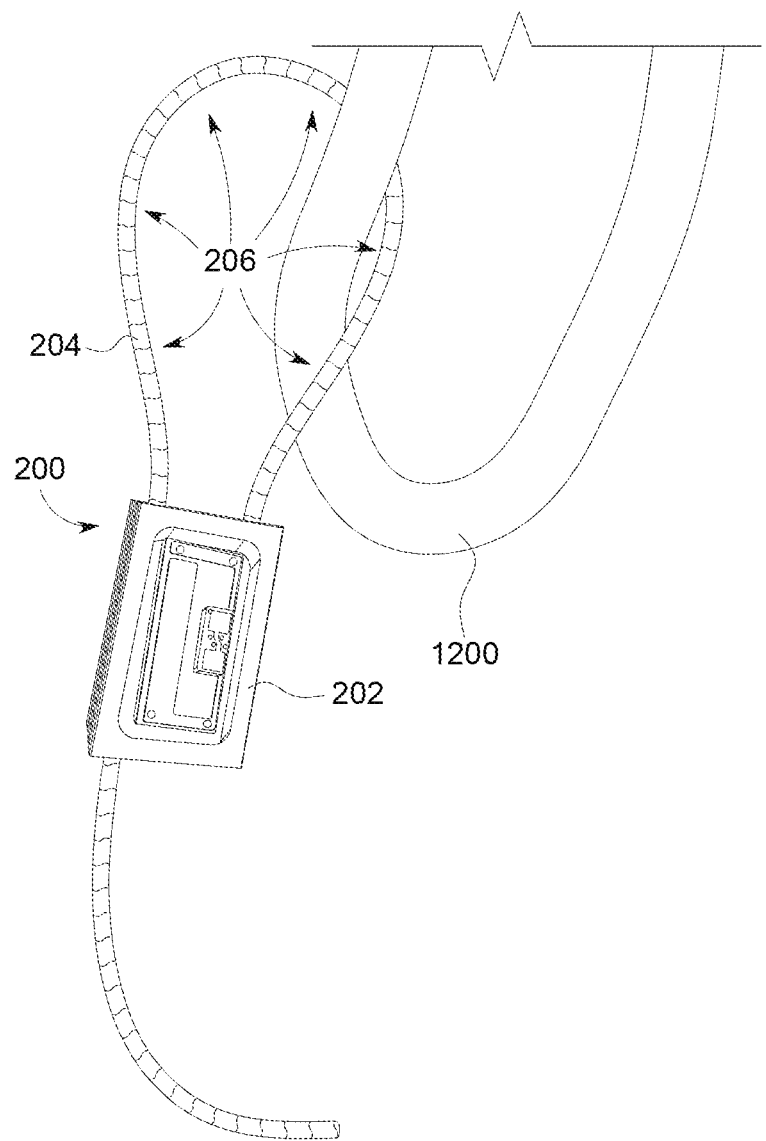

FIG. 12 illustrates a perspective view of the cable-tie carrier 200 attached to a part 1200. In the illustrated embodiment, the cable 204 is threaded through both the part 1200 and the chip holder 202. The resultant cable loop 206 forms around the part 1200 to hold the cable tie-holder 200 thereto. Slack in the cable loop 206 may increase or decrease (i.e., tightened or loosened) by moving the threaded cable 204 through the chip holder in different directions.

In operation, the electronic chip 500 may be read by computing devices of users in the field or in a service center. The electronic chip 500 may include various identifiers that that are unique to either the electronic chip 500 and/or the parts or equipment to which the cable-tie carrier 200 is attached.

The disclosed embodiments provide a product enhancement of the existing RFID, NFC, and electronic product tags. The design enhances data transfer and product attachment security of the electronic chip. In some embodiments, the wire cable tie carrier is attached firmly but loosely enough around the product and may be rotated to improve data transfer. Additionally, the disclosed cable-tie carriers 200 have shown to increase data transfer ranges for RFID, NFC, and other types of electronic chips.

The cable-tie carriers 200 disclosed herein include, in some embodiments, a chip holder 202 that is formed from a single piece unit, which reduces production cost and increases data conductivity of a housed electronic chip. In some embodiments, the electronic chip has a frequency offset designed to compensate for a frequency shift from the cable-tie carrier 200. Together the increased data conductivity and frequency shift provide maximize data transfer rates at legally approved frequencies for the electronic chip. Also, the locking functionality of the cable 204 allows the cable-tie carrier 200 to be security connected and rotated for readability, which are particularly useful when handling large pieces of O&G equipment.

Moreover, the cable-tie carrier 200 is, in some embodiments, designed with a frequency conductive material to allow for maximum signal range for reading and writing electronic chip information. The carrier 204 also, in some embodiments, has a wire leash that allows the cable 204 to be secured to a product. Further, the cable 204 may operate as an enhanced antenna providing additional wireless transmission when connected at both sides to the chip holder 202. Put another way, the tie-cable carrier 200 may not only carrier the electronic chip but may also enhance its signal once connected around a piece of equipment.

Some embodiments include computer-executable instructions that are operable to track parts to which the electronic chip 191 in the cable-tie carrier 200 are attached. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

Figure 13:
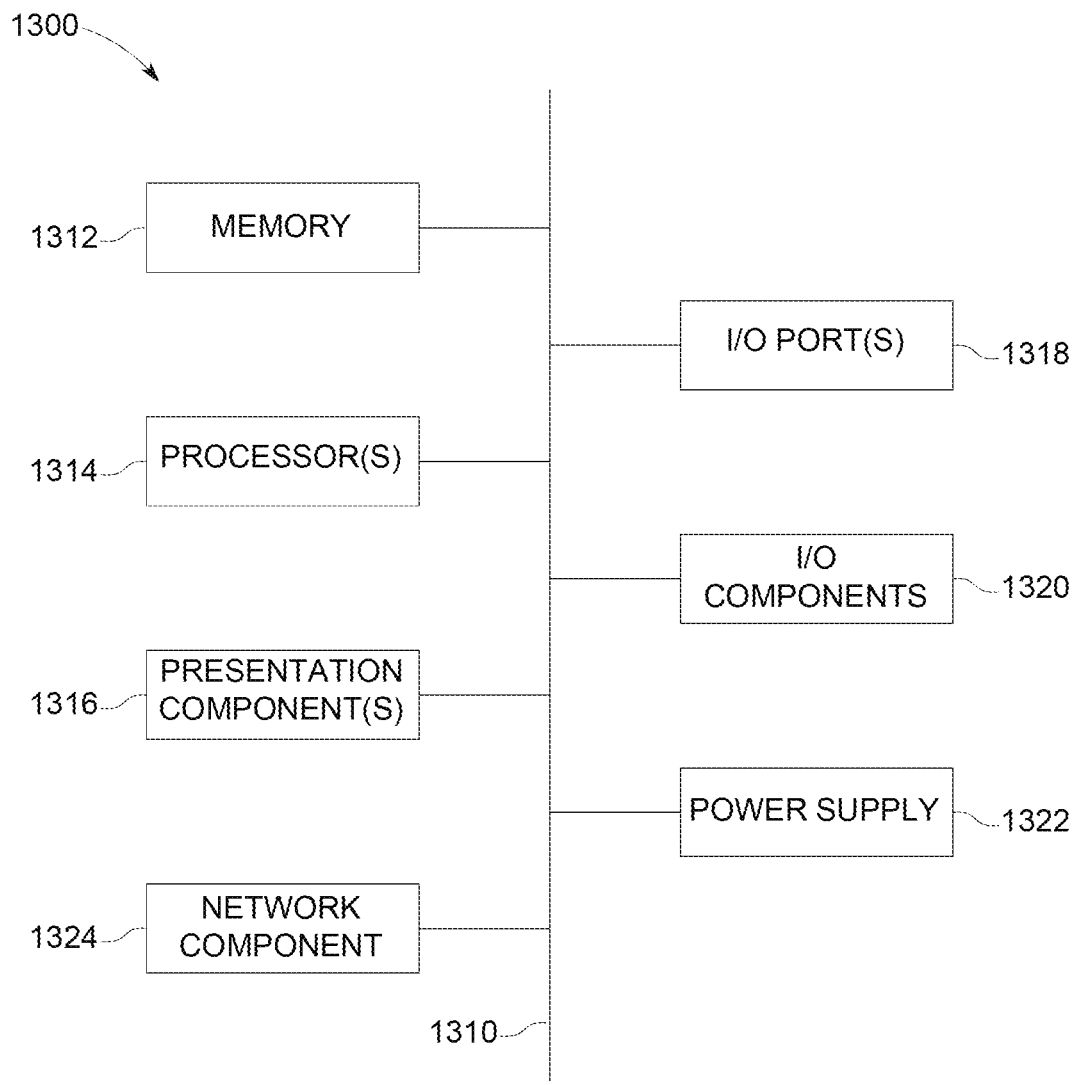
FIG. 13 is a block diagram of an external computing device with an ID reader, according to some embodiments.

FIG. 13 is a block diagram of an example computing device 1300 for implementing aspects disclosed herein is shown and designated generally as computing device 100. Computing device 1300 is but one example of a suitable computing environment and is not intended to suggest any limitation as to the scope of use or functionality of the invention. Neither should the computing device 1300 be interpreted as having any dependency or requirement relating to any one or combination of components/modules illustrated.

As previously mentioned, several different use-cases are possible for the cable-tie carriers 200 disclosed herein. One in particular involves attaching the cable-tie carriers 200 to various parts that make up a manifold for conveying frack fluid from one or more fluid pumps to a frack tree (commonly referred to as a "Christmas tree") or to a zipper manifold. A zipper manifold, as referenced herein, means a system of frack valves that directs frack fluid from a missile to one or more frack trees, also facilitating quick redirection of frack fluid from one frac tree to another. Some examples of a zipper manifold are disclosed in U.S. patent application Ser. No. 15/631,534 filed on Jun. 23, 2017, which is entitled "ADJUSTABLE FRACTURING SYSTEM," and PCT Application Number PCT/US2018/41160 filed on Jul. 7, 2018 and entitled "CONNECTION BETWEEN AN OIL AND GAS FRACTURING TREE AND A ZIPPER MODULE." Both of these applications are incorporated by reference herein for all intents and purposes.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smartphones, mobile tablets, wearable (e.g., smart glasses, smart watch, or and the like), hand-held devices, consumer electronics, specialty computing devices, etc. The disclosed examples may also be practiced in distributed computing environments, where tasks are performed by remote-processing devices that are linked through a communications network.

Computing device 1300 includes a bus 1310 that directly or indirectly couples the following devices: memory 1312, one or more processors 1314, one or more presentation components 1316, input/output (I/O) ports 1318, I/O components 1320, a power supply 1322, and a network component 1324. Computer device 1300 should not be interpreted as having any dependency or requirement related to any single component or combination of components illustrated therein. While computer device 1300 is depicted as a seemingly single device, multiple computing devices 1300 may work together and share the depicted device resources. For instance, memory 1312 may be distributed across multiple devices, processor(s) 1314 may provide housed on different devices, and so on.

Bus 1310 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and it is reiterated that the diagram of FIG. 1 is merely illustrative of an exemplary computing device that can be used in connection with one or more embodiments of the present invention. Distinction is not made between such categories as "workstation," "smart phone," "mobile tablet," "server," "laptop," "hand-held device," etc., as all are contemplated within the scope of FIG. 13 and the references herein to a "computing device."

Memory 1312 may include any of the of the computer-readable media discussed below in the section captioned "Exemplary Operating Environment." Memory 1312 may be used to store and access instructions configured to carry out the various operations disclosed herein. In some examples, memory 1312 includes computer-storage media in the form of volatile and/or nonvolatile memory, removable or nonremovable memory, data disks in virtual environments, or a combination thereof.

Processor(s) 1314 may include any quantity of processing units that read data from various entities, such as memory 1312 or I/O components 1320. Specifically, processor(s) 1314 are programmed to execute computer-executable instructions for implementing aspects of the disclosure. The instructions may be performed by the processor, by multiple processors within the computing device 1300, or by a processor external to the client computing device 1300. In some examples, the processor 1314 are programmed to execute instructions such as those illustrated in the flowcharts discussed below and depicted in the accompanying drawings. Moreover, in some examples, the processor(s) 1314 represent an implementation of analog techniques to perform the operations described herein. For example, the operations may be performed by an analog client computing device 1300 and/or a digital client computing device 1300.

More specifically, the processor(s) 1314 may be programmed through instructions stored in the memory 1312 drive an ID reader, such as an RFID, NFC, or other type of reader capable of retrieving the stored information on the electronic chips discussed herein. Ports 1318 allow computing device 1300 to be logically coupled to other devices including I/O components 1320, some of which may be built in. The I/O components may include an RFID, NFC, or other type of reader as the ID reader, operable for retrieving or otherwise reading the IDs, part information, or part data stored in the electronic chips 191.

Presentation component(s) 1316 present data indications to a user or other device. Exemplary presentation components include a display device, speaker, printing component, vibrating component, etc.

In some examples, the network component 1324 includes a network interface card and/or computer-executable instructions (e.g., a driver) for operating the network interface card. Communication between the computing device 100 and other devices may occur using any protocol or mechanism over any wired or wireless connection. In some examples, the network component 1324 is operable to communicate data over public, private, or hybrid (public and private) using a transfer protocol, between devices wirelessly using short range communication technologies (e.g., RFID, NFC, BLUETOOTH®-branded communications, or the like), or a combination thereof.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

What is claimed is:

1. A cable-tie carrier configured to hold an electronic chip with an antenna, the cable-tie carrier comprising:
    a chip holder having a recess cavity for receiving the electronic chip in a position to have the antenna facing out of the recessed cavity,
        wherein a single outer surface of the chip holder has first and second openings; and
    a cable having a first end that is permanently fixed to the chip holder at the first opening and a second end, opposite the first end, that is removably attachable to the chip holder at the second opening,
        wherein attachment of the second end causes the cable to form a cable loop configured to couple the chip holder to a part.

2. The cable-tie carrier of claim 1, wherein the chip holder is made of aluminum.

3. The cable-tie carrier of claim 1, wherein the chip holder is made of at least one of polyurethane, rubber, or steel.

4. The cable-tie carrier of claim 1, wherein the electronic chip comprises a radio frequency identification (RFID) tag.

5. The cable-tie carrier of claim 1, wherein the electronic chip comprises a near field communication (NFC) tag.

6. The cable-tie carrier of claim 1, wherein the electronic chip stores an identifier specific to the electronic chip that is associated with the part.

7. The cable-tie carrier of claim 1, wherein the electronic chip stores an identifier specific to the part to which the chip holder is coupled via the cable.

8. The cable-tie carrier of claim 1, wherein the electronic chip stores a part number or manufacturer of the part.

9. The cable-tie carrier of claim 1, wherein the second end of the cable is threaded through the chip holder.

10. The cable-tie carrier of claim 1, wherein the electronic chip is held in the recessed cavity by epoxy, glue, or at least one magnet.

11. The cable-tie carrier of claim 1, wherein the part is selected from the group consisting of a fluid end, a swivel, a joint, a manifold trailer, safety iron, a safety hammer, a dart valve, a plug valve, a clapper check valve, a pressure relief valve, an emergency unloading valve, a gate valve, a subsea dosage valve, a hydraulic valve, a valve seat, a butterfly valve, a steadseal valve, a hyperseal valve, a Polytetrafluoroethylene-lined valve, a swingthrough valve, a rubber-sealing valve, a rubber-line valve, a fire safe valve, a swing and lift check valve, a T-pattern globe valve, a Y-pattern globe valve, a three-way globe valve, a compressor check valve, a cold reheat check valve, a cold heat check valve, a testable check valve, a reverse current valve, a parallel slide valve, a gate valve, a safety valve, a safety relief valve, an isolation valve, a relief valve, a mounted-ball valve, a ball valve, a diaphragm valve, a triple offset butterfly valve, a gate and globe valve, a check valve, a lift check valve, a swing check valve, a steam isolation valve, a feedwater isolation valve, an integrated safety valve, a single-stage turbine, a multi-stage turbine, a hydraulic turbine, a pump turbine, a quad-runner turbine, a gear operator, a pneumatic actuator, a pressure control panel, a lifting clamp, a flow line safety restraint, a choke, a drop ball injector, a pump, a blowout preventer, a gas separator, an overshot connector, a wellhead, a frac pump, a manifold system, a fluid end system, a slurry pump, a water pump, a subsea pump, a premix tank, a frac tree, a swellable packer, a manifold skid, a tubing head, a wellhead, a rod rotator, a stuffing box, a casing head, a tubing head, and a control valve.

12. A cable-tie carrier configured to hold a radio frequency (RFID) electronic chip, the cable-tie carrier comprising:
 an electronic chip configured to store an identifier specific to either the electronic chip or a part;
 a chip holder having a recess cavity for holding the electronic chip,
  wherein a border gap exists between outer edges of the electronic chip and inner edges of the recess cavity;
 an adhesive for holding the electronic chip in the recess cavity,
  wherein the adhesive is filled in the border gap between the outer edges of the electronic chip and the inner edges of the recess cavity; and
 a cable having at least one end that is removably attachable to the chip holder,
  wherein attachment of the at least one end causes the cable to form a cable loop configured to couple the chip holder to a part.

13. The cable-tie carrier of claim 12, wherein the chip holder is made of aluminum.

14. The cable-tie carrier of claim 12, wherein the adhesive is an epoxy.

15. The cable-tie carrier of claim 12, wherein the adhesive is disposed along a back face of the electronic chip facing a recessed face of the recess cavity.

16. The cable-tie carrier of claim 12, wherein the identifier comprises a serial number of the part.

17. A system, comprising:
 a part;
 an electronic chip, comprising:
  a processor,
  memory for storing an identifier or test data specific to the part, and
  an antenna for transmitting the identifier or the test data; and
 a cable-tie carrier, comprising:
  a chip holder having a recess cavity for holding the electronic chip in a position that orients the antenna to face out of the recess cavity,
   wherein a single outer surface of the chip holder has first and second openings; and
  a cable having a first end that is permanently fixed to the chip holder at the first opening and a second end, opposite the first end, that is removably attachable to the chip holder at the second opening,
   wherein attachment of the second end causes the cable to form a cable loop configured to couple the chip holder to the part.

18. The system of claim 17, further comprising:
 a computing device with an ID reader configured for retrieving the identifier or the test data from the electronic chip.

19. The system of claim 18, wherein the computing device is a smart phone or a mobile tablet.

20. The system of claim 17, wherein the electronic chip is attached to the chip holder by one or more magnets.

* * * * *